US012578535B2

(12) United States Patent
Blaicher et al.

(10) Patent No.: US 12,578,535 B2
(45) Date of Patent: Mar. 17, 2026

(54) OPTICAL WAVEGUIDE COMPONENT AND METHOD FOR THE PRODUCTION THEREOF

(71) Applicant: Karlsruher Institut für Technologie, Karlsruhe (DE)

(72) Inventors: Matthias Blaicher, Ettlingen (DE); Aleksandar Nesic, Stutensee (DE); Pascal Maier, Karlsruhe (DE); Andreas Hofmann, Stutensee (DE); Yilin Xu, Karlsbad (DE); Christian Koos, Siegelsbach (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 380 days.

(21) Appl. No.: 18/245,954

(22) PCT Filed: Sep. 24, 2021

(86) PCT No.: PCT/EP2021/076291
§ 371 (c)(1),
(2) Date: Mar. 20, 2023

(87) PCT Pub. No.: WO2022/063945
PCT Pub. Date: Mar. 31, 2022

(65) Prior Publication Data
US 2023/0367075 A1 Nov. 16, 2023

(30) Foreign Application Priority Data
Sep. 25, 2020 (DE) ...................... 10 2020 212 112.5

(51) Int. Cl.
G02B 6/30 (2006.01)
G02B 6/26 (2006.01)

(52) U.S. Cl.
CPC ............... *G02B 6/30* (2013.01); *G02B 6/262* (2013.01)

(58) Field of Classification Search
CPC ............. G02B 6/10; G02B 6/30; G02B 6/262
See application file for complete search history.

(56) References Cited

U.S. PATENT DOCUMENTS 8,903,205 B2 12/2014 Koos et al.
9,034,222 B2 5/2015 Koos et al.
(Continued)

FOREIGN PATENT DOCUMENTS

DE 10033899 A1 1/2002
DE 102011101433 A1 12/2012
(Continued)

*Primary Examiner* — Michael P Mooney
(74) *Attorney, Agent, or Firm* — Woodard, Emhardt, Henry, Reeves & Wagner, LLP

(57) ABSTRACT

The invention relates to an optical waveguide component and to a method for the production thereof. The optical waveguide component comprises: —at least one optical waveguide structure (10, 11, 12, 13) which is in the form of a first three-dimensional freeform structure and which has at least one first portion (10a, 10e, 10f, 10g, 10i, 10j) which is enclosed by at least one jacket material (30); •—at least one guide structure (20), which is in the form of a second three-dimensional freeform structure, in the vicinity of the at least one first portion (10a, 10e, 10f, 10g, 10i, 10j); and •—the at least one jacket material (30), which at least partially fills a spatial region between the at least one first portion (10a, 10e, 10f, 10g, 10i, 10j) and the at least one guide structure (20), wherein the at least one guide structure (20) defines a region within which the at least one first portion (10a, 10e, 10f, 10g, 10i, 10j) is enclosed by the at least one jacket material (30), and wherein at least one second portion (10b, 10c, 10d, 10h) of the optical waveguide structure (10, 11, 12, 13) or at least one optical component (Continued)

(200) adjacent to the optical waveguide structure (10, 11, 12, 13) is not enclosed by the at least one jacket material (30).

12 Claims, 10 Drawing Sheets

(56)  References Cited

U.S. PATENT DOCUMENTS

| | | | |
|---|---|---|---|
| 10,654,232 B2 | 5/2020 | Thiele et al. | |
| 11,169,446 B2 | 11/2021 | Dietrich et al. | |
| 11,500,159 B2 | 11/2022 | Shikama et al. | |
| 2012/0057841 A1 | 3/2012 | Wysocki et al. | |
| 2015/0078712 A1 | 3/2015 | Brunner et al. | |
| 2017/0075067 A1* | 3/2017 | Filipowicz | G02B 6/2558 |
| 2021/0382231 A1 | 12/2021 | Shikama et al. | |

FOREIGN PATENT DOCUMENTS

| | | |
|---|---|---|
| DE | 102016221464 A1 | 5/2018 |
| EP | 3162549 A1 | 5/2017 |
| WO | 2019165205 A1 | 8/2019 |
| WO | 2020085083 A1 | 4/2020 |
| WO | 2020110700 A1 | 6/2020 |

* cited by examiner

OPTICAL WAVEGUIDE COMPONENT AND METHOD FOR THE PRODUCTION THEREOF

FIELD OF THE INVENTION

The present invention lies in the field of integrated photonics and micro-optics and relates to an optical waveguide component and a method for the production thereof. In this case, the optical waveguide component can be produced at least in part by using a method for three-dimensional freeform microstructuring. The optical waveguide component can serve for example to transmit light between different optical components or between free space sections and optical components. Other applications are conceivable.

PRIOR ART

The functionality and the efficiency of an optical waveguide component often depend not only on a position and a three-dimensional shape of functionally relevant optical substructures, but also on differences in refractive index at interfaces between the substructures forming the optical waveguide component. Many applications require laterally single-mode waveguiding, for example, which can be achieved by a sufficiently small difference in refractive index with respect to a cladding region surrounding the waveguide core. In other applications, by contrast, it may be advantageous to set a higher difference in refractive index, for example in order to avoid emission losses in narrow waveguide bends or in order to be able to set guiding properties of the optical waveguide structure. Moreover, many freeform microstructuring methods are faced with the problem of a direction-dependent resolution, resulting in unavoidable direction-dependent variations of the smallest producible cross-sectional area of optical waveguide structures. Furthermore, it may be desirable to be able to set the shape of the cladding material surrounding the waveguide core in a targeted manner in a lateral direction, for example in order to achieve a uniform thickness of the cladding region in lateral directions.

U.S. Pat. No. 8,903,205 B2 and U.S. Pat. No. 9,034,222 B2 each disclose a method and an arrangement for using optical freeform waveguides manufactured at a target position using 3D lithography to interconnect different optical components. The fact that, in terms of position, shape and size, the light guiding cores of the freeform waveguides can easily be adapted to the position, shape and size of the optical component parts to be connected is exploited here. The freeform waveguide cores produced are then globally embedded into a cladding material, the further form of which is undefined, for the purpose of refractive index matching.

EP 3 162 549 A1 discloses an optical element produced layer by layer by using a 3D printer and comprising at least one microfluidic cavity, which is likewise produced layer by layer by using the 3D printer and is filled with a functional substance for the purpose of providing desired properties in specific application examples. The application examples described therein relate to optical arrangements comprising lenses and stops.

WO 2020/085083 A1 discloses an arrangement comprising two optical waveguides connected by using a 3D-printed waveguide structure produced from photoresist, and furthermore a likewise 3D-printed box structure around the optical waveguide, said box structure being designed to enable a cladding with air. Furthermore, an arrangement is disclosed which, by using the structuring of the photoresist, makes it possible to provide a portion-by-portion embedding of the optical waveguide core into a straight portion comprising structurable material, while bent regions are still enveloped by air.

US 2015/0078712 A1 discloses a method for producing an optical interconnect, comprising 3D printing of a plurality of non-intersecting and spaced apart optical waveguides from a material that guides electromagnetic waves. At least some of the optical waveguides change their direction at least once by about 90°. The method furthermore comprises cladding at least each end of the optical waveguides with a material having a lower refractive index than the material from which the optical waveguides were formed.

WO 2019/165205 A1 discloses a tapering core structure which is written on the end of an optical fiber by using a 3D printing method. The tapering core may expand the mode diameter for improved coupling between fibers or may reduce the mode diameter to enhance coupling to a waveguide smaller than the fiber core. The core is surrounded by a cladding. The diameter of the core is varied while it is being written, allowing different profiles to be produced. The 3D printing method allows multiple fibers to be provided with conical cores in the same process cycle.

US 2012/0057841 A1 discloses methods that provide an optical fiber termination structure with a small volume and very low return loss, even when the fiber termination structure is in direct proximity to reflective surfaces.

DE 100 33 899 A1 discloses a switch for electromagnetic radiation, constructed from at least two control electrodes, one or more inputs and outputs for the electromagnetic radiation to be switched and electrophoretically mobile particles that are not transmissive to the electromagnetic radiation in a suspension that is transmissive to the electromagnetic radiation.

OBJECT OF THE INVENTION

Proceeding therefrom, the object of the present invention consists in providing an optical waveguide component and a method for the production thereof which at least partly overcome the disadvantages and limitations of the prior art.

The object of the present invention consists, in particular, in setting differences in refractive index at internal interfaces between the substructures forming the optical waveguide component, and in particular between the waveguide core and the cladding, to at least one desired functionality in each case and in being able to vary them in a targeted manner within the structure, in particular along the direction of propagation of the light guided in the waveguide. In particular, the intention is thus to make it possible for the substructures of the optical waveguide component which are produced by using a freeform microstructuring method and are functionally relevant with regard to their shape, such as e.g. the waveguide cores, for the purpose of setting the refractive index, to be able to be combined with the greatest possible diversity of locally applied cladding materials which vary along the direction of propagation of the light, wherein the cladding materials used need not necessarily be structurable with high resolution by using a freeform microstructuring method.

Furthermore, the object of the present invention is to make it possible to produce continuously single-mode waveguide structures with locally high index contrast between core and cladding even under the restrictions of a direction-dependent resolution of the structuring method. In this regard, for example, in the case of lithography methods based on multi-photon absorption, a polymerization reaction takes place in a spatial region surrounding the focal point of the writing beam, a so-called voxel, which has an ellipsoidal shape extended along the beam direction and dependent on the numerical aperture of the objective lens used in each case. The direction-dependent extent of said voxel determines the resolution and shape of the producible structures, which can lead to severe restrictions particularly in the case of single-mode waveguides. In the case of two-photon lithography with a frequently used lithography wavelength of 780 nm and a numerical aperture (NA) of 1.4, the length of the voxel measured along the lithography beam is typically between 1 μm and 2 μm, while the width measured perpendicularly thereto is typically less than 500 nm. At the same time, in the case of a waveguide core surrounded by air (refractive index 1.0) and having an operating wavelength of 1.5 μm, a refractive index of 1.5 and a round cross-sectional area, the limit with respect to the multimode characteristic is at a radius of approximately 500 nm. Waveguide portions which are surrounded by vacuum, air or some other gas (refractive index approximately 1.0) instead of by a solid or liquid cladding material are indispensable for specific functions such as e.g. branch junctions or polarization beam splitters and can be configured in single-mode fashion by this method only if the waveguide axis is oriented substantially parallel to the axis of the lithography beam. By contrast, for waveguide portions whose axis is oriented perpendicularly or at a large angle with respect to the lithography beam, a single-mode characteristic cannot be achieved in conjunction with high index contrast by the lithography method described above. In this regard, the object of the invention consists in making possible continuously single-mode waveguide structures produced by three-dimensional direct writing laser lithography even if they contain elements which are based on a high refractive index contrast between core and cladding. In this context, a single-mode waveguide is understood to mean a waveguide in which a maximum of two fundamental modes that are differentiable with regard to their polarization are capable of propagation in each cross-sectional area.

Furthermore, the object of the invention is to combine waveguide cores produced by a 3D microstructuring method with a cladding region having a well-defined shape in a lateral direction, said cladding region enabling protection against mechanical and/or chemical environmental influences. Said cladding region is intended to be configured such that mechanical stresses and other forces acting on the cladding region are largely minimized and an undesired deformation of the waveguide core is thus avoided.

DISCLOSURE OF THE INVENTION

This object is achieved by using an optical waveguide component and a method for the production thereof having the features of the independent patent claims. Advantageous developments, which are realizable individually or in any desired combination, are provided in the dependent claims.

The words "have", "comprise" or "include" or any desired grammatical deviations therefrom will be used below in a non-exclusive manner. Accordingly, these words can relate both to situations in which no further features in addition to the features introduced by those words are present, and to situations in which one or more further features are present. For example, the expression "A has B", "A comprises B", or "A includes B" can relate both to the situation in which, apart from B, no further element is present in A (i.e. to a situation in which A consists exclusively of B), and to the situation in which, in addition to B, one or more further elements are present in A, such as element C, elements C and D, or even further elements.

It should furthermore be pointed out that the expressions "at least one" and "one or more" and grammatical deviations of these expressions when used in connection with one or more elements or features, if said expressions are intended to express that the element or feature may be provided once or multiple times, are generally only used once, for example upon first introduction of the feature or element. If the feature or element is subsequently mentioned again, the corresponding term "at least one" or "one or more" is generally not used again, without limiting the possibility that the feature or element may be provided once or multiple times.

Furthermore, the words "with preference", "preferably", "in particular", "for example" or similar words are used below in connection with optional features without alternative embodiments being limited hereby. For example, features which are introduced by these words are optional features, and there is no intention of limiting the scope of protection of the claims and in particular of the independent claims by these features. For example, the invention, as will be understood by a person skilled in the art, can also be performed using different configurations. Similarly, features introduced by way of "in one embodiment of the invention" or by way of "in one exemplary embodiment of the invention" are understood to be optional features, without alternative configurations or the scope of protection of the independent claims being intended to be limited hereby. Furthermore, these introducing expressions are not intended to touch upon all possibilities of combining the features introduced hereby with other features, be they optional or non-optional features.

In a first aspect, the present invention relates to an optical waveguide component, comprising:

at least one optical waveguide structure configured in form of a first three-dimensional freeform structure;

at least one guide structure configured in form of a second three-dimensional freeform structure in the vicinity of the at least one optical waveguide structure; and at least one cladding material, which at least partly fills a spatial region between the at least one optical waveguide structure and the at least one guide structure.

In particular, the at least one cladding material can fill the spatial region between the at least one optical waveguide structure and the at least one guide structure in such a way that at least one first portion of the optical waveguide structure is surrounded by the at least one cladding material, wherein the at least one guide structure defines a region within which the at least one first portion is surrounded by the cladding material, and that at least one second portion of the optical waveguide structure or at least one optical component adjacent to the optical waveguide structure is not surrounded by at least one cladding material. Preferably, in this case, the at least one optical component adjacent to the optical waveguide structure and not surrounded by the at least one cladding material can be produced by the same freeform microstructuring method as the first three-dimensional freeform structure.

The terms "optical", "radiation" or "light" relate to any type of electromagnetic waves that can be guided in an optical waveguide. In addition to the visible optical range, which has a vacuum wavelength $\lambda$ between 400 nm and 800 nm, this includes in particular the UV range of $1\ nm \le \lambda \le 400$ nm, the infrared range of $800\ nm \le \lambda \le 1$ mm and the microwave range of 1 mm≤λ≤1 m, with the range of 30 μm≤λ≤3 mm also being referred to as "THz range" and the range of 1 mm≤λ≤1 cm also being referred to as "millimeter wavelength range". Unless mentioned otherwise, numerical values specified below, especially for dimensions of structures or for describing performance parameters of microstructuring methods, e.g. for resolution or accuracy, relate to arrangements designed for a vacuum operating wavelength λ of approximately 1.5 μm. For other operating wavelengths, the specified numerical values can be scaled proportionally to the wavelength, in particular with the refractive indices of the utilized materials being taken into account.

The optical waveguide component comprises at least one optical waveguide structure present in the form of a three-dimensional freeform structure, preferably produced by using a first freeform microstructuring method. In this case, the term "optical waveguide component" denotes an optical component in which light is guided at least in portions by using an optical waveguide, and which thus has at least one optical waveguide structure. The term "optical waveguide structure" generally denotes any arrangement designed to guide an electromagnetic wave in the wavelength range defined above. That includes, in particular, individual optical waveguides, optical waveguides having branch junctions, polarization filters, polarization beam splitters, polarization converters, tapers, directional couplers, couplers based on multimode interference (MMI), waveguide networks and waveguide-based components, including in combination with micro-optical elements such as lenses, mirrors, or prisms. However, other types of optical waveguide structures are conceivable. In this case, the electromagnetic wave can be guided in the optical waveguide structure in particular by using total internal reflection at an optical interface or by using multiple reflection at periodically arranged elements, for example in the case of an optical waveguide based on a photonic band gap or on a photonic crystal. In more complex optical waveguide structures, such as e.g. in so-called "Sub-Wavelength Grating Waveguides", abbreviated to "SWG", the waveguiding is based on an effectively increased refractive index in the region of the waveguide core. In this case, the waveguiding by using an optical waveguide structure is based on the fact that in contrast to propagation of light in free space, the divergence of the light propagating in the optical waveguide structure in a lateral direction is prevented by the light constantly interacting with dielectric interfaces, or is controlled in the case of a tapering or widening optical waveguide. As a result, it becomes possible to guide light in an axial direction in a region that is elongated in the direction of propagation, wherein the ratio of the axial extent of the light-suffused region is preferably more than 3, particularly preferably more than 5, and very particularly preferably more than 10 or 20. In addition to the at least one optical waveguide structure, the optical waveguide component can have even further, optical structures, in particular selected from at least one refractive, diffractive and/or reflective optical element, for example at least one lens or mirror, which are designed to additionally alter the propagation of the electromagnetic radiation in the optical waveguide component.

The present optical waveguide component furthermore comprises at least one guide structure configured in the form of a second three-dimensional freeform structure situated in the vicinity of the at least one optical waveguide structure. By using the guide structure, it is possible to stipulate a precisely definable region within which the optical waveguide structure can be surrounded by a cladding material, for which purpose use can preferably be made of capillary forces in a "spatial region", also referred to as "interspace", between the at least one guide structure and the at least one optical waveguide structure. The term "vicinity" denotes a suitably chosen distance between the guide structure and the at least one portion of the at least one optical waveguide structure that is to be surrounded by the at least one cladding material. In this case, the distance that defines the term "vicinity" is chosen with a magnitude at least such that this distance is a multiple of a penetration depth of the optical radiation guided in the at least one portion of the at least one optical waveguide structure into the surrounding cladding region, in order to avoid coupling of the guided radiation with the guide structure. In this case, the penetration depth δ is defined as the depth at which the evanescent electric field generated by the mode guided in the waveguide structure has decreased by the factor 1/e. In particular, the penetration depth δ can be estimated using equation (1):

$$\delta \approx \lambda/(n_e^2 - n_2^2) > \lambda/(n_1^2 - n_2^2), \tag{1}$$

where $n_1$ denotes the refractive index in the optical waveguide structure, $n_2$ denotes the refractive index in the cladding region enveloping the optical waveguide structure, and $n_e$ denotes the effective refractive index of the mode guided in the waveguide structure. In this case, the distance can be chosen with a magnitude in particular at least such that the distance is preferably double, particularly preferably triple, very particularly preferably five times or ten times the penetration depth δ. Given a vacuum operating wavelength of the optical waveguide component of approximately 1.5 nm, this distance is preferably from 1 μm to 500 nm, particularly preferably from 2 μm to 100 nm, in particular from 5 μm to 50 nm. For other operating wavelengths, the specified numerical values can be scaled proportionally to the wavelength, in particular with the refractive indices of the utilized materials being taken into account. In this case, the guide structure can preferably be configured such that the guide structure has no direct contact with the core of the waveguide structure.

The at least one guide structure makes it possible to enclose at least one portion of the at least one optical waveguide structure that is surrounded by the at least one guide structure, in particular with capillary forces being utilized, locally with the at least one cladding material and thus to set the refractive index contrast of the at least one waveguide portion in a targeted manner. In this way, in the case of more complex optical waveguide structures comprising a plurality of portions, individual regions can also be provided with the at least one cladding material, or a plurality of portions can be provided with different cladding materials, with the result that the refractive index contrast at the core-cladding interface can be configured in such a way that the refractive index contrast changes along the direction of propagation. This can be advantageous for a combination of different optical elements, the configuration of which in each case makes different requirements of the refractive index contrast. A corresponding configuration of the guide structure as a protective structure can make it possible, in particular, to avoid an undesired embedding of subregions of the waveguide structure into the cladding material.

Furthermore, the invention solves the problem of producing continuously single-mode waveguide structures with locally high index contrast between core and cladding even under the restrictions of a direction-dependent resolution of the structuring method. In this regard, waveguide portions which have to have a high index contrast that is indispensable for specific functions such as e.g. branch junctions or polarization beam splitters can be aligned in such a way that the waveguide axis is oriented substantially parallel to the axis of the lithography beam and that the best possible resolution for the lithographic definition of the waveguide core is thus achieved. By contrast, other waveguide portions whose axis is oriented perpendicularly or at a large angle with respect to the lithography beam can be structured with a larger cross section and can be configured in single-mode fashion by way of a local embedding into a cladding material with a sufficiently high refractive index. For structuring with a waveguide portion oriented substantially parallel to the axis of the lithography beam with high index contrast, the largest diameter of the waveguide core measured perpendicularly to the waveguide axis is preferably less than 3 µm, particularly preferably less than 2 µm, and very particularly preferably less than 1.5 µm. For structuring with a waveguide portion oriented substantially perpendicularly to the axis of the lithography beam with low index contrast, the largest diameter of the waveguide core measured perpendicularly to the waveguide axis is preferably from 1.5 µm to 25 µm, particularly preferably from 1.5 µm to 15 µm, and very particularly preferably from 2 µm to 12 µm. These numerical values relate to an implementation of the invention with the aid of a lithography method based on multiphoton absorption with a lithography wavelength of 780 nm and a numerical aperture (NA) of 1.4. For other lithography methods, the values mentioned have to be adapted according to the voxel shape present in each case. For smaller aperture values, owing to a more greatly elongated voxel, in particular the largest diameter of the waveguide core measured perpendicularly to the waveguide axis increases in the waveguide portions oriented perpendicularly to the axis of the lithography beam.

Furthermore, the invention makes it possible to precisely define the shape and extent of the cladding region in a lateral direction by way of a corresponding configuration of the at least one guide structure. In this case, the term "lateral" denotes a direction that is locally perpendicular to the direction of propagation of the optical field guided in the waveguide; a direction parallel to the direction of propagation is referred to as "axial". It thus becomes possible to configure the cladding region that is indispensable for protection against mechanical and/or chemical environmental influences in such a way that, apart from unavoidable anchoring points, it has no contact with other elements of the arrangement such as e.g. other optical component parts or mounting plates are made ("submounts"). It thus becomes possible largely to minimize the forces acting on the cladding region from other elements and to avoid a deformation or destruction of the waveguide core that results from said forces. Forces acting on the cladding region from other elements can arise for example owing to thermally or otherwise induced mechanical stresses and can result in a reduced lifetime of the waveguide component. In one preferred embodiment of the invention, the guide structure can be configured in such a way that a symmetrical cladding of the optical waveguide structure by the cladding material arises, with the result that forces that occur also within the cladding material for example owing to a curing process and a shrinkage process associated therewith are largely compensated for, without deformation of the waveguide structure.

Furthermore, the at least one guide structure can have at least one fluid stop, which can preferably be integrated in the at least one guide structure. In this case, the term "fluid stop" denotes a substructure of the at least one guide structure which constitutes a barrier to further advancement of a material, in particular of at least one cladding material present in liquid form at a time of introduction into the spatial region between the at least one optical waveguide structure and the at least one guide structure. Advancement or expansion of the at least one cladding material beyond a defined region can be prevented in this way.

The at least one guide structure which defines the at least one portion of the at least one optical waveguide structure that is enclosed by the at least one cladding material makes it possible to use a great diversity of materials as waveguide cladding. For this purpose, it is not necessary for the at least one cladding material to be structurable with high resolution itself by way of a freeform microstructuring method; rather, it is sufficient that the at least one cladding material can be introduced by using a dispensing method, in particular, between the at least one guide structure and the at least one optical waveguide structure configured as a waveguide core. In this case, introduction can preferably be facilitated by the at least one guide structure being supplemented by at least one further feed structure, which enables the at least one cladding material to be introduced by filling. Advantageously, in this case, the at least one feed structure can be configured in such a way that the at least one cladding material is guided from a common feed point to different guide structures, thereby enabling the at least one cladding material to be applied efficiently, particularly in the case of complex guide structures.

The at least one cladding material can be selected from a multiplicity of materials. In a configuration in which the waveguide core comprises at least one polymer, in particular low refractive index polymers are suitable for this purpose, which can be fluorinated or can comprise polysiloxane-based components. The at least one cladding material which at least regionally surrounds the at least one optical waveguide structure configured as a waveguide core has a refractive index that is preferably from 1 to 1.5, particularly preferably from 1.2 to 1.5, in particular from 1.3 to 1.45. The difference in refractive index between the material of the waveguide core and the at least one cladding material is preferably from 0.05 to 1, particularly preferably from 0.1 to 0.7, in particular from 0.15 to 0.6. The cladding material can preferably be chosen such that it has the least possible absorption at the operating wavelength of the optical waveguide. The material absorption of the cladding material at the operating wavelength of approximately 1.5 µm is preferably less than 10 dB/mm, particularly preferably less than 5 dB/mm, and very particularly preferably less than 2 dB/mm or 1 dB/mm. At other operating wavelengths, these values can be scaled anti-proportionally to the wavelength. For further details in relation to the proposed arrangement, reference is made to the exemplary embodiments below.

In one preferred configuration, the optical waveguide component according to the invention can be produced in direct physical contact with further optical components and in the process can be aligned, preferably precisely, with optical coupling points of said components. The term "optical coupling point" used hereinafter denotes firstly an area of a light-emitting optical component or of a structure of the light-emitting optical component which the light passes through last during an emission of said light, or secondly the area of a light-receiving optical component or of a structure of the light-receiving optical component on which light impinges first when said light is received.

Hereinafter, the terms "optical component part" and "optical component" denote an optical element designed to emit, transport, receive, detect and/or manipulate electromagnetic radiation, while the term "optical system" denotes an arrangement of at least two optical components or a combination of one or more arrangements according to the invention, among themselves, with at least one optical component or with at least one further additional structure produced in combination with the arrangement according to the invention, in particular at least one optical waveguide or at least one micro-optical element. Preferably, each optical component used in the context of the present invention is selected from the group comprising: optical fibers, in particular single-mode fibers or multi-mode fibers composed of organic or inorganic materials; integrated-optical chips, in particular photodiodes, linear or planar photodiode arrays, CCD arrays or image sensors, in particular on the basis of semiconductors, preferably silicon or III-V compound semiconductors, or dielectric materials, preferably glasses, silicon dioxide, silicon nitride or polymers; bolometers; lasers, in particular vertical cavity surface emitting lasers (VCSELs) or edge emitting lasers; superluminescent diodes; optical circuit boards; elements for free space optics, in particular lenses, beam splitters, isolators, mirrors or diffraction gratings. Other optical components are conceivable. The optical components can preferably comprise optical waveguides with low index contrast, in particular glass-based optical waveguides, or with medium or high index contrast, in particular waveguides based on semiconductors or dielectric materials. Input coupling or output coupling of light can preferably occur at an edge or on a surface of the optical component; in particular, at an edge of an edge emitting laser, at a chip edge, or at a facet of a waveguide-based system; alternatively, at a surface of a surface emitting laser or a surface-illuminated photodiode, or on the surface of a waveguide-based chip which comprises at least one optical coupling point, in particular comprising a grating coupler or a deflection mirror. However, other methods of input coupling or output coupling of light are possible.

In a further aspect, the present invention relates to a method for producing an optical waveguide component, in particular an optical waveguide component disclosed herein. In detail, the steps of the method are as follows:

a) producing at least one optical waveguide structure configured in form of a first three-dimensional freeform structure by using a first freeform microstructuring method;

b) producing at least one guide structure configured in form of a second three-dimensional freeform structure in the vicinity of the at least one optical waveguide structure by using a second freeform microstructuring method; and c) introducing at least one cladding material into a spatial region between the at least one optical waveguide structure and the at least one guide structure.

In particular, introducing the at least one cladding material into the spatial region between the at least one optical waveguide structure and the at least one guide structure in accordance with step c) can be effected in such a way that at least one first portion of the optical waveguide structure is surrounded by the at least one cladding material, wherein the at least one guide structure defines a region within which the at least one first portion is surrounded by the cladding material, and that at least one second portion of the optical waveguide structure or at least one optical component adjacent to the optical waveguide structure is not surrounded by the at least one cladding material. Preferably, in this case, the at least one optical component adjacent to the optical waveguide structure and not surrounded by the at least one cladding material can be produced by the same freeform microstructuring method as the first three-dimensional freeform structure.

The implementation of steps a) and b) need not be carried out strictly sequentially but rather can also be included in other manufacturing processes running in parallel. In this case, each of steps a) to c) can also be carried out repeatedly and at least successive steps can also be carried out at least partly simultaneously. Moreover, further steps can additionally be carried out.

The production of the present structures, i.e. of the at least one optical waveguide structure, the at least one guide structure and optionally at least one support structure designed for mechanically fixing the at least one guide structure, is effected in situ, i.e. directly at a target position, by using at least one suitable freeform microstructuring method. In this case, the utilized term "freeform microstructuring method" denotes a subtractive or additive manufacturing method, by using which three-dimensional structures, preferably freeform structures, can be produced. In this context, the term "freeform structure" is understood to mean a structure which can have surfaces with any desired curvature at least regionally, within the scope of technical limitations in relation to resolution and accuracy. The freeform structure thus differs in particular from structure geometries which can be produced on planar substrates by conventional planar microstructuring methods, i.e. for example by a combination of thin-film deposition methods, two-dimensional lithography methods such as projection lithography, and etching processes. As a rule, a combination of these conventional processes leads to prism-like three-dimensional structure geometries which each have a top surface and a base surface substantially parallel to the substrate surface, said base surface and top surface being identical or very similar in terms of their shape and being interconnected by using side walls which are perpendicular, inclined or else inwardly or outwardly arched in relation to the substrate surface, depending on the selected etching process or deposition process. In this case, the shape of the base surface and the top surface is substantially predefined by the mask used for local etching or deposition, said mask often being lithographically structured. Multilayer structures consisting of a plurality of prism-like substructures can be constructed by multiple repetition of the etching process or deposition process with different masks. However, the additional outlay connected with this repetition is enormous and is in many cases also restricted by an overlay accuracy, and so the number of layers is often restricted to a few in practice, for example three. This leads in particular to geometric limitations of the structures producible with tenable outlay using conventional microstructuring methods, and hence leads to functional restrictions of the component parts formed thereby.

Freeform structures produced by using freeform microstructuring methods are not subjected to these restrictions, or at least not to the same extent, since their structure geometry is not limited to a combination of a comparatively small number of planar, prism-like substructures. It thus becomes possible, in particular, to produce optical waveguide components and/or guide structures with any desired three-dimensional geometries. It should generally be noted in this context that freeform structures are in many cases likewise produced from a multiplicity of individual layers, preferably by using a multi-layered material application in the case of 3D printing or by using photochemically induced curing of various layers in the case of a 3D lithography method. However, freeform microstructuring methods allow, with tenable production outlay, the number of these layers to be chosen with a magnitude such that this yields a good approximation of the freeform structure and that the discretization into individual layers no longer constitutes any practical functionally relevant limitation of the producible structure geometries. In this case, the present structures are preferably constructed from at least 5, particularly preferably at least 10, in particular at least 20 or 30, layers.

In order to produce the at least one optical waveguide structure for a vacuum operating wavelength of approximately 1.5 nm, a thickness of a layer is preferably between 10 nm and 1000 nm, particularly preferably between 30 nm and 500 nm, in particular between 50 nm and 300 nm. It thus becomes possible to produce the at least one optical waveguide structure with deviations of less than 1000 nm, particularly preferably less than 500 nm, in particular less than 100 nm. In this case, the resolution of the freeform microstructuring method is preferably better than 3 nm, particularly preferably better than 1 nm, in particular better than 500 nm. The numerical values mentioned above relate to the production of the at least one optical waveguide structure provided for a vacuum operating wavelength of approximately 1.5 nm. For other operating frequencies, the dimensions of the at least one optical waveguide structure and hence the requirements in respect of accuracy and resolution of the microfabrication method used for production purposes can be scaled accordingly, if appropriate with the refractive indices of the utilized materials being taken into account.

For producing the at least one guide structure and optionally the at least one support structure, less stringent requirements in respect of the accuracy and resolution of the freeform microstructuring methods are sufficient, as a result of which an advantageous increase in the structuring speed can be achieved in many cases. Depending on the size of the at least one guide structure and its distance from the at least one optical waveguide structure, the at least one guide structure can be produced using freeform microstructuring methods in which the deviations of the realized structure from the ideal structure are preferably at most 10 μm, particularly preferably at most 3 μm, in particular at most 1 μm. The associated resolutions are preferably better than 50 μm, particularly preferably better than 10 μm, in particular better than 5 μm or 2 μm.

The optical waveguide structure and the at least one guide structure can be produced using different freeform microstructuring methods or the same freeform microstructuring method; in the case where the same freeform microstructuring method is used, all structures can advantageously be produced in a common work operation.

In one preferred configuration, the freeform microstructuring method and/or a freeform microstructuring unit facilitating such a method can be based on a lithographic method, which in particular uses the concept of stereolithography or direct writing, preferably three-dimensional direct writing, lithography methods. In this case, additive or subtractive manufacturing methods can be used, with the term "additive manufacturing method" denoting a production method in which material is continuously applied to or on a structure, while the term "subtractive manufacturing method" describes an alternative production method in which material is removed from a structure. In the preferred embodiment, material application or material ablation can be achieved by lithographic methods using suitable photoresists, in particular negative or positive resists. In one preferred configuration, spatial light modulators which allow fast patterning can be used here in a stereolithography method. In one preferred configuration, multi-photon lithography methods can be used as direct writing lithography methods, in particular by using pulsed laser sources. In this case, use can be made of light pulses with a pulse duration of at most 10 ps, preferably at most 1 ps, particularly preferably at most 200 fs, in particular at most 100 fs, in the case of a repetition rate of preferably at least 1 MHz, preferably 10 MHz, particularly preferably at least 25 MHz, in particular at least 80 MHz. What are suitable for this purpose are, in particular, laser light sources selected from fiber-based femtosecond lasers or pulsed solid-state lasers such as titanium:sapphire lasers or diode lasers, which can be combined with frequency conversion units, for example for frequency multiplication, for summation frequency generation or for difference frequency generation. Depending on the utilized lithography method, use can preferably be made here of wavelengths in the near infrared, visible or ultraviolet spectral range or in the range of extreme UV (EUV) radiation or in the range of x-ray wavelengths. In one particularly preferred embodiment, said wavelengths are from 150 nm to 1700 nm, in particular from 300 nm to 1100 nm. In the case of pulsed lasers, two-photon, three-photon or multi-photon absorption effects can be achieved in a targeted manner by a suitable choice of pulse duration and pulse energy. Diode lasers having emission wavelengths of between 360 nm and 550 nm, i.e. for example around 365 nm, 385 nm, 405 nm, 550 nm and 532 nm, are appropriate in the case of lithography methods based on single-photon absorption using continuous-wave lasers. In order to increase the resolution of lithography methods, the principle of stimulated emission depletion (STED) following corresponding microscopy methods may be used with suitable photoinitiators. Moreover, further microstructuring methods for producing the waveguide-based optical coupling element are conceivable, in particular methods that may be based on material extrusion, powder-bed fusion, material jetting, binder jetting, selective laser sintering or electron-beam melting. Depending on the microstructuring method used in each case, the waveguide structure can comprise a polymer, in particular a preferably optically additively or subtractively structurable acrylate, epoxy resin, or a fluoropolymer, a metal or a metal-coated dielectric.

In one particular embodiment, the optical waveguide component according to the invention can be configured such that it enables light to be transmitted efficiently between two optical component parts. In this context, use can be made of the possibility, following the concept of "photonic wire bonding" during the production process, of firstly detecting the position and location of the optical coupling points to be connected, and then designing a trajectory adapted thereto for the core of the optical waveguide and, if appropriate, also a corresponding shape of the guide structure for the cladding material. In this case, the trajectory of the waveguide core is chosen such that a maximally precise coupling to the optical coupling points of the optical components becomes possible, wherein the undesired deviations from the position of maximum coupling efficiency are preferably less than 1 μm, particularly preferably less than 500 nm, and very particularly preferably less than 200 nm or 100 nm.

In respect of further details in relation to the present method, reference is made to the description of the arrangement and to the exemplary embodiments.

Advantages of the Invention

The advantages of the invention reside in the possibility of achieving a precisely definable local coverage of the optical waveguide structure and thus enabling a free adaptation of the refractive index contrast through the choice of suitable cladding materials introduced locally. As a result, it becomes possible, for example, for only a single mode to be guided in the optical waveguide and thus for an efficient coupling to single-mode optical components to become possible. Furthermore, in portions different requirements in respect of the refractive index contrast can be made possible simultaneously by virtue of said contrast being varied in a targeted manner along the direction of propagation.

Furthermore, the invention makes it possible to produce continuously single-mode waveguide structures with locally high index contrast between core and cladding even under the restrictions of a direction-dependent resolution of the underlying structuring method, for example by virtue of the fact that waveguide portions that are limited with regard to the resolvable cross section as a result of their orientation are configured in single-mode fashion by way of a local embedding into a cladding material with a sufficiently high refractive index. This advantage is of great importance for the realization of waveguide-based polarization beam splitters, for example, in which functionally relevant waveguide portions with high index contrast can be aligned parallel to the writing beam and can thus be realized with small cross sections.

In particular, no guide structure known from the prior art makes it possible to stipulate a precisely definable region within which the optical waveguide structure can be surrounded by a cladding material. WO 2020/085083 A1 involves a portion-by-portion embedding of the waveguide core into the cladding material having different refractive index contrasts. However, that is achieved by way of a direct structuring of the cladding material, which can be regarded as part of the likewise directly structured box structure and which consists of a lithographically structurable photoresist. What is disadvantageous about that is that it necessitates structuring the cladding material itself, which greatly limits a selection of possible cladding materials, in particular.

Furthermore, the invention makes it possible to precisely define the shape and extent of the cladding region in a lateral direction by way of a corresponding configuration of the guide structure. It thus becomes possible, in particular, to configure the cladding region that is indispensable for protection against mechanical and/or chemical environmental influences in such a way that, apart from individual anchoring points, it can have no contact with other elements of the arrangement such as e.g. other optical component parts or mounting plates ("submounts"), and so it is possible largely to minimize the forces acting on the cladding region and to avoid a deformation or destruction of the waveguide core that results from said forces.

Furthermore, WO 2020/085083 A1 does not disclose the filling of a spatial region between a prestructured waveguide structure and a guide structure. Rather, in that document the cladding material serves as a solid structural element produced by direct lithographic structuring; the filling of a spatial region with a liquid material is not carried out. An opening used in WO 2020/085083 A1 serves for removing a photoresist that remains after the structuring process, and is subsequently closed again in an airtight manner with a cover.

Optional use of guide structures, fluid stops or outlet elements makes it possible to reduce a pressure on the guide structures and thus to prevent an overflow onto the substrate. The use of a wide variety of freeform microstructuring methods for producing the at least one optical waveguide structure and the at least one guide structure enables the optical waveguide component to be flexibly adapted to the circumstances of a wide variety of optical components and, if necessary, extended by mechanically stabilizing support structures. The present invention allows a great diversity of cladding materials to be used for a geometrically precise embedding of optical freeform waveguides, wherein the at least one cladding material, for its part, need not necessarily be structurable with high resolution by using a freeform microstructuring method. The present invention thus differs from US 2015/0078712 A1 and WO 2019/165205 A1, which disclose the embedding of waveguide structures over the entire length of the cladding material, and so those documents do not include a waveguide component produced by using a freeform microstructuring method and having the greatest possible diversity of locally applied cladding materials that vary along the direction of propagation of the light.

BRIEF DESCRIPTION OF THE FIGURES

Further details and features of the present invention are evident from the following description of preferred exemplary embodiments, in particular in conjunction with the dependent claims. Here, the respective features can be implemented by themselves, or a plurality thereof can be implemented together in combination. The invention is not limited to the exemplary embodiments. The exemplary embodiments are illustrated schematically in the following figures. Identical reference numerals in the figures refer to identical or functionally identical elements or to elements which correspond to one another in terms of their functions. Specifically:

FIGS. 14 and 15 each show an SEM micrograph of three optical waveguide components in accordance with FIG. 1 before (FIG. 14) and after (FIG. 15) the introduction of the at least one cladding material, in a perspective view.

DESCRIPTION OF THE EXEMPLARY EMBODIMENTS

Figure 1:
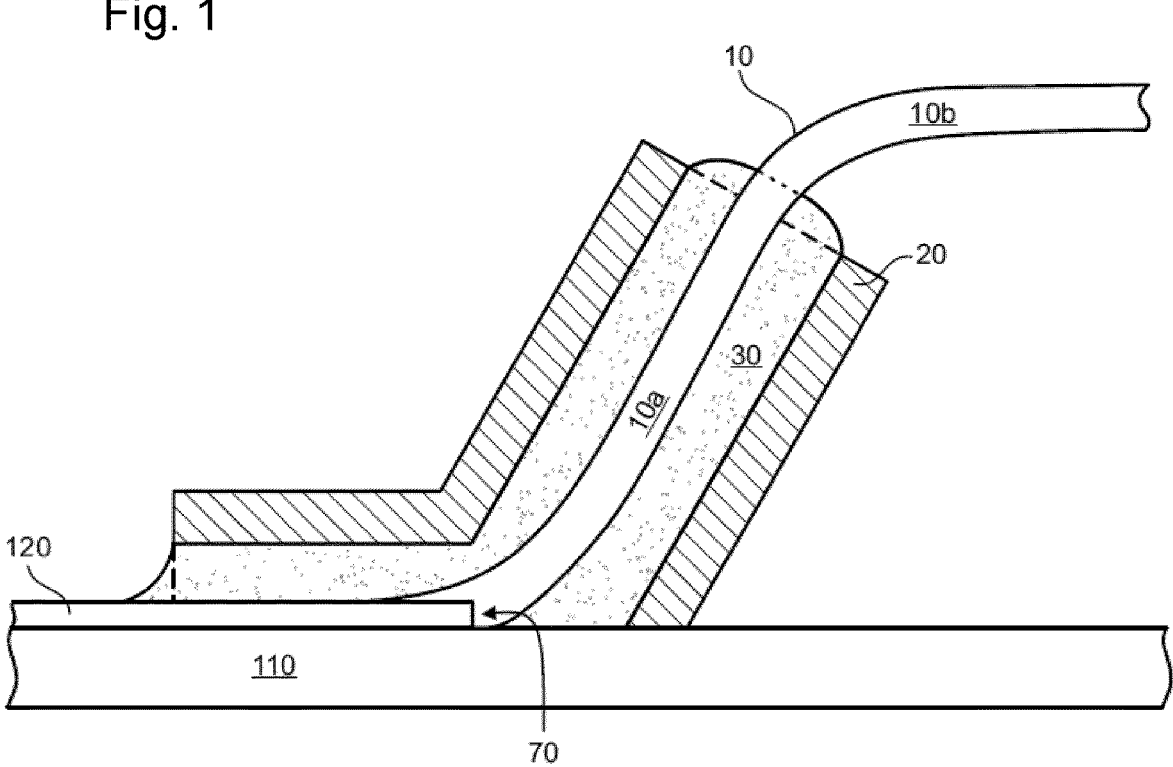
FIGS. 1 and 2 each show one preferred exemplary embodiment of an optical waveguide component according to the invention.
Figure 2:
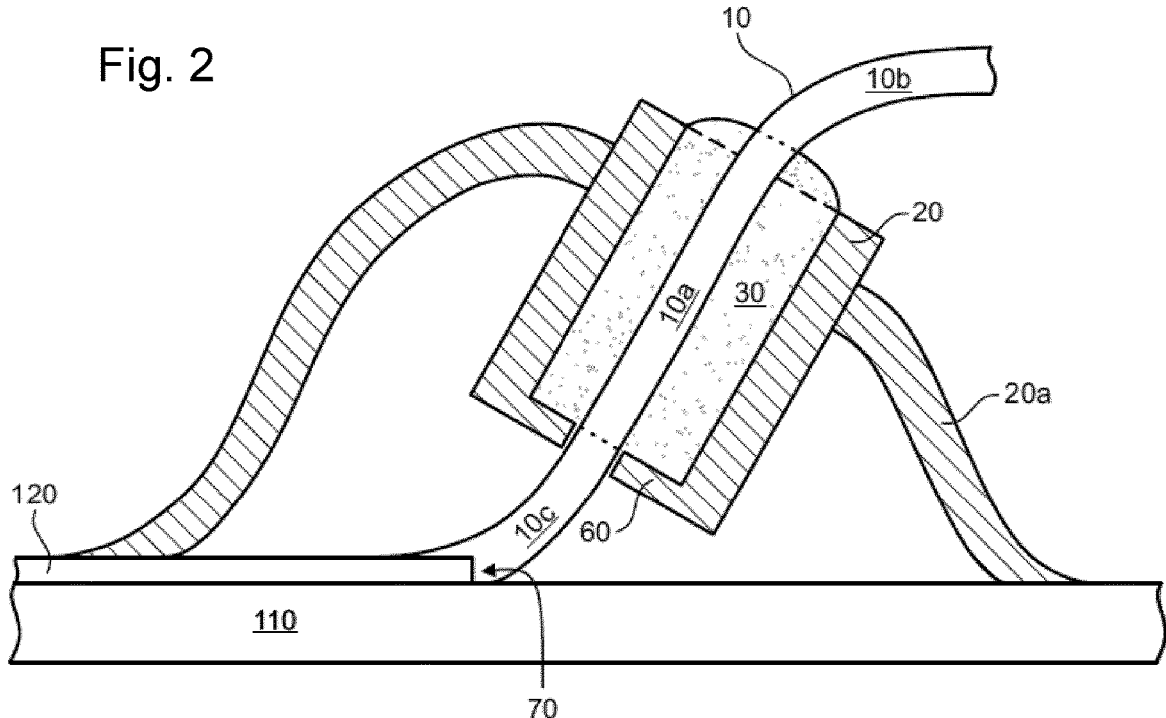

FIGS. 1 and 2 each show a schematic illustration of one preferred exemplary embodiment of an optical waveguide component according to the invention. The optical waveguide structure 10 illustrated as a freeform structure becomes detached, proceeding from an optical coupling point 70 of the optical waveguide 120 situated on an optical substrate 110, in an upward direction and is surrounded by a guide structure 20 situated in the vicinity. The optical waveguide structure 10 is surrounded by the guide structure 20 in a region in which the optical waveguide structure 10 is detached from the optical substrate 110, said guide structure making it possible, as in FIG. 1, to cover only a lower portion 10a of the optical waveguide structure 10 and the optical substrate 110 or, as in FIG. 2, to cover only a central portion 10a of the optical waveguide structure 10 with a cladding material 30, while further portions 10b, 10c of the optical waveguide structure 10 are not surrounded by the cladding material 30. It thus preferably becomes possible to adapt and optimize the refractive index contrast in the different portions 10a, 10b, 10c of the optical waveguide structure 10 to the respective requirements. The cladding material 30 introduced in liquid or solid form at least partly fills a spatial region between the optical waveguide structure 10 and the guide structure 20. As shown in FIGS. 1 and 2, the entire arrangement can be operated without a further cladding material in order to enable the greatest possible refractive index contrast in the waveguide portions 10c and 10b. Alternatively, the entire structure can be globally covered by a further cladding material (not shown), the refractive index of which differs from that of the cladding material 30.

As shown in FIG. 2, the guide structure 20 can have, firstly, additional support structures 20a designed in particular for stabilizing the guide structure 20 and, secondly, fluid stops 60 designed for filling the spatial region between the optical waveguide structure 10 and the guide structure 20 up to a predefined point. In one preferred embodiment, the cladding material 30 in the liquid state can be introduced into the spatial region between the optical waveguide structure 10 and the guide structure 20 with capillary forces being utilized, and can then cure by itself or be cured, preferably by using an optical method or a thermal method.

Figure 3:
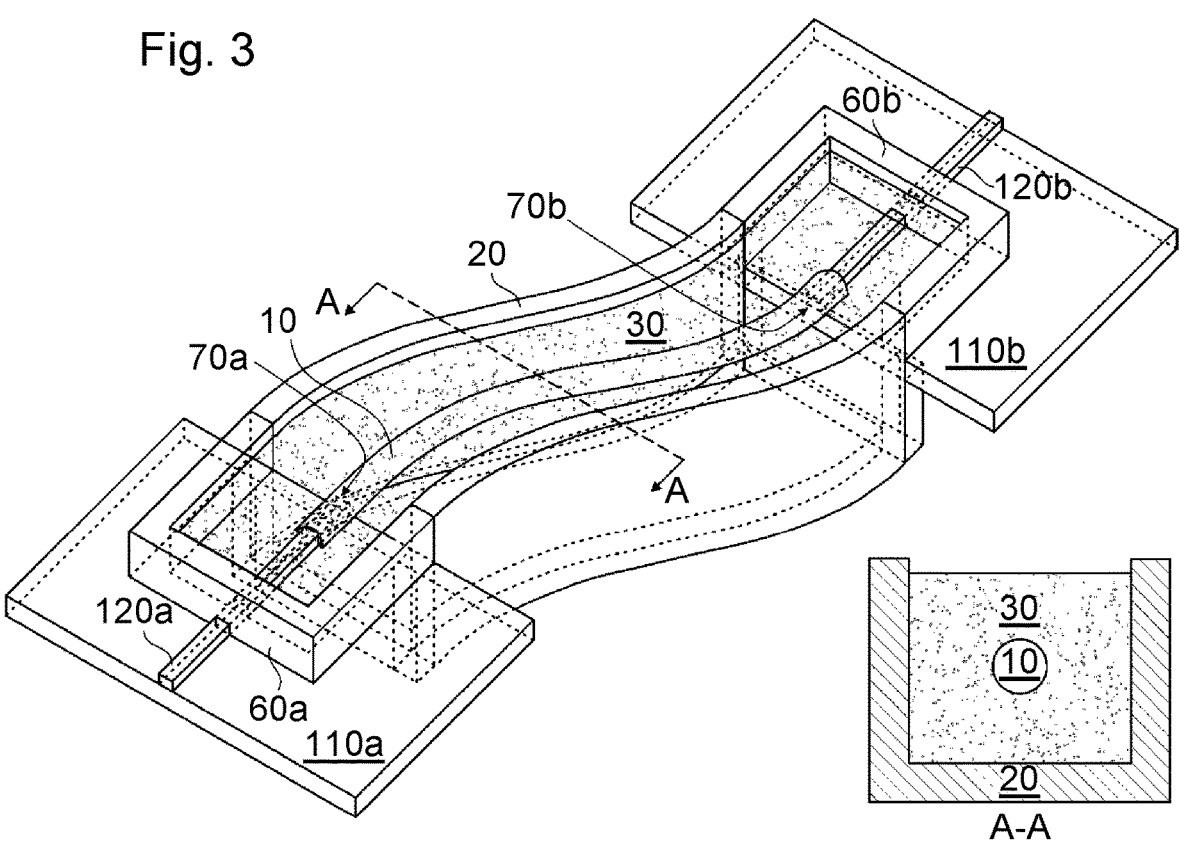
FIG. 3 shows a further preferred exemplary embodiment of the optical waveguide component according to the invention, arranged between two optical components.

FIG. 3 shows a further preferred exemplary embodiment of the optical waveguide component according to the invention, arranged between two optical components 110a, 110b. This illustrates by way of example a localized cladding of the optical waveguide structure 10 by using the cladding material 30, which is in direct contact with the optical components 110a, 110b in the region of the coupling points 70a, 70b. The optical waveguide structure 10 connects the two optical waveguides 120a, 120b of the two optical components 110a, 110b and is at least partly enveloped by the guide structure 20 extending along the trajectory of the optical waveguide structure 10. As is furthermore illustrated, fluid stops 60a, 60b can be used at both ends in order to avoid an undesired spreading of a liquid cladding material 30 from the guide structure 20 onto the surface of the optical components 110a, 110b. Consequently, an unwanted coverage of the remaining surface of the optical substrate 110 can be avoided and only the spatial region between the optical waveguide structure 10 and the guide structure 20 can be filled in a targeted manner. Particularly for the purpose of bridging deep gaps between two optical components 110a, 110b set up on thick optical substrates 110, the guide structure 20 furthermore enables the optical waveguide structure 10 to be clad as symmetrically as possible by using the applied cladding material 30, which otherwise would not remain in the vicinity of the optical waveguide structure 10. With the aid of the guide structure 20, it is possible to precisely define the shape and extent of the cladding region in a lateral direction. It thus becomes possible to configure the cladding region in such a way that, apart from the unavoidable anchorings at the optical components 110a, 110b, it has no contact with other elements of the arrangement. Consequently, it is possible largely to minimize the forces acting on the cladding region from other elements and to avoid a deformation or destruction of the waveguide core that results from said forces.

In one preferred embodiment of the invention, the guide structure 20 is configured in such a way that a symmetrical cladding of the optical waveguide structure 10 by the cladding material 30 arises, with the result that forces that occur also within the cladding material 30 for example owing to a curing process and a shrinkage process associated therewith are largely compensated for, without deformation of the waveguide structure 10.

Figure 4:
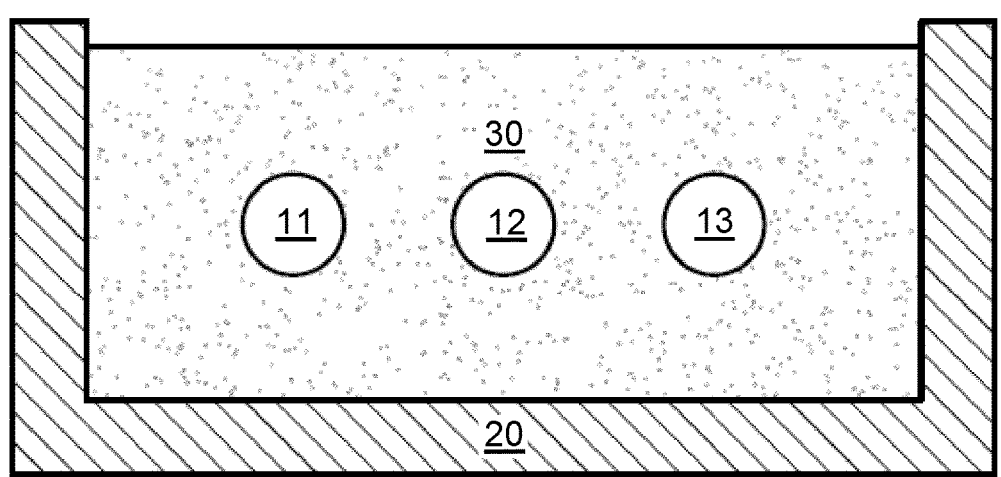
FIG. 4 shows a further preferred exemplary embodiment of the optical waveguide component according to the invention, having three optical waveguide structures.

The embodiments illustrated by way of example in FIGS. 1 to 3 can be modified in diverse regards. In this respect, in FIGS. 1 to 3, a cross section of the optical waveguide structure is maintained along a direction of propagation. In a departure from that, it is also possible to change the shape and/or the size of the cross section along the trajectory and to convert it for example continuously from a round shape into an elliptical, square, rectangular or other shape. This shape can be adapted in particular to the cross sections and the mode field profiles of the optical coupling points 70a, 70b of the optical components 110a, 110b to be linked in each case, in order in this way to attain the most efficient coupling possible. Furthermore, the profile of the guide structure 20 in FIG. 3 need not necessarily remain constant over the entire length, but rather can change along any desired trajectory between the optical substrates 110 of the two optical components 110a, 110b. Ultimately, any desired shapes and geometries are conceivable for implementing the support structures 20a, which can be adapted in particular to the circumstances of the optical components 110a, 110b. In preferred embodiments, for example, an exact position of the optical components 110a, 110b to be connected by the optical waveguide structure 10, and their optical coupling points 70a, 70b, may not be known from the outset, but rather may only be determined shortly before the printing process by using suitable measurement methods and may then be used to design a waveguide trajectory or waveguide geometry of the optical waveguide structure 10 with the least possible losses. Therefore, it is not straightforwardly possible to determine beforehand a structure which can be used to attain a symmetrical cladding of an arbitrary optical waveguide structure 10, present as a freeform structure, with a cladding material 30. In one preferred embodiment, therefore, the shape of the guide structure 20 can be derived from the trajectory of the optical waveguide structure 10 to be enveloped. As shown schematically in FIG. 4, in further embodiments it may also be advantageous for a plurality of optical waveguide structures 11, 12, 13 running approximately parallel at least in portions to be surrounded by a common guide structure 20 designed for precise application of a common cladding material 30.

Figure 5:
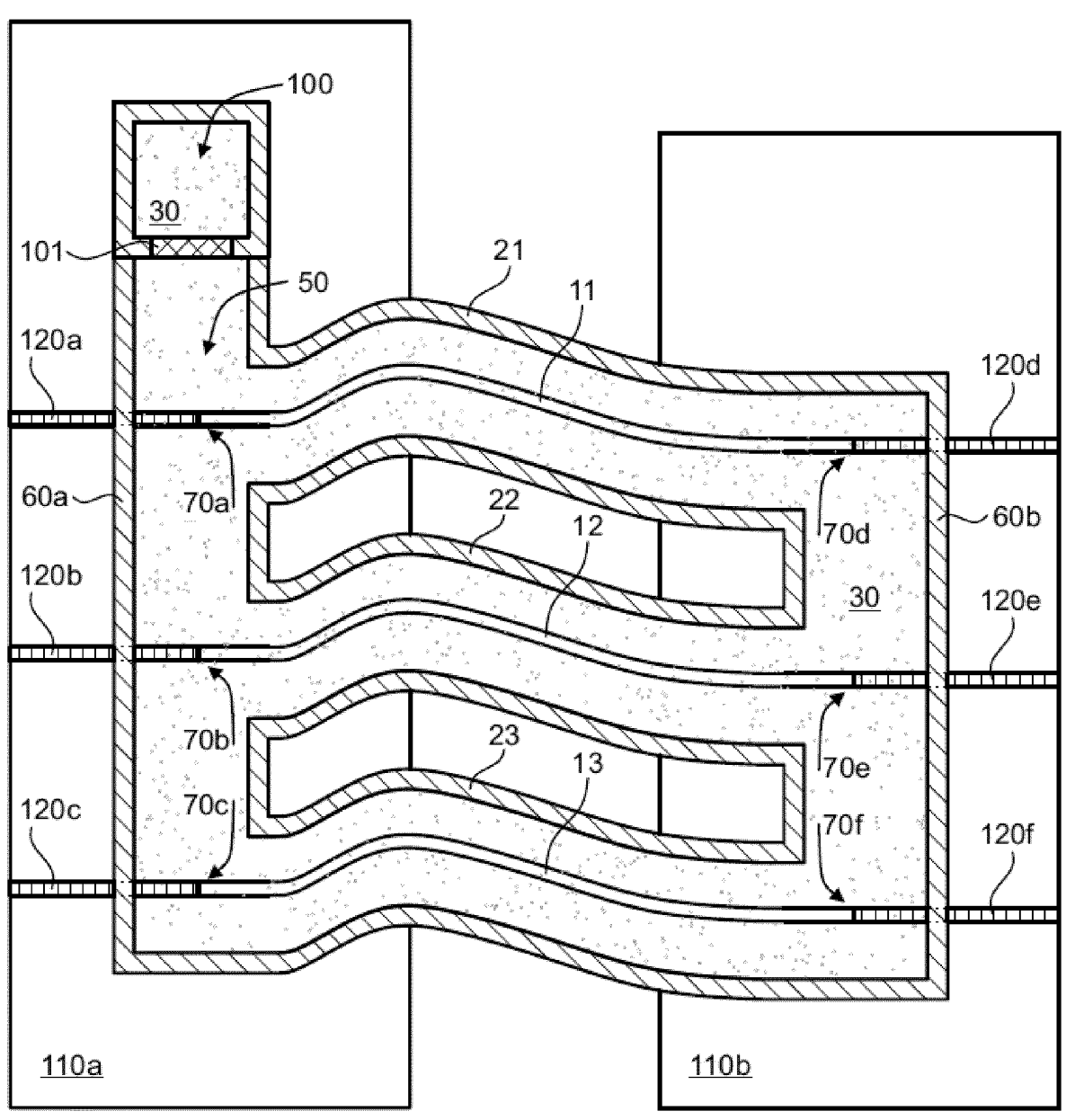
FIG. 5 shows a further preferred exemplary embodiment of the optical waveguide component according to the invention, comprising three optical waveguide structures, which is arranged between two optical components and has a common feed point.

FIG. 5 shows a further preferred exemplary embodiment of the optical waveguide component according to the invention, arranged between two optical components 110a, 110b. In addition, the associated method for producing the optical waveguide component according to the invention can also be explained with reference to this illustration. In a first step, the optical waveguide substructures 11, 12, 13 that jointly form the waveguide structure are produced by using a first freeform microstructuring method and in the process are preferably each adapted to the position and orientation of the optical coupling points 70a, 70b, 70c of the optical component 110a and respectively the optical coupling points 70d, 70e, 70f of the optical component 110b. This is then followed by production of at least one substructure 21, 22, 23, which substructures jointly form the guide structure 20, in the vicinity of the respective waveguide substructures 11, 12, 13 by using a second freeform microstructuring method. The cladding material 30 can be introduced at a single feed point 100, which allows the targeted distribution of the cladding material 30 by using an opening 101 to the feed point 100. Alternatively (not illustrated), a plurality of feed points 100 are also possible. By way of common feed structures 50, the liquid cladding material 30 can be transported to each substructure 21, 22, 23 of the guide structure 20 in order thus to attain a cladding of the associated optical waveguide structures 11, 12, 13 that is as symmetrical as possible. The common feed structures 50 serve as a network for the defined distribution of the cladding material 30 to the spatial region between the optical waveguide structure 10 and the guide structure 20 and allow application of the cladding material 30 to be done as efficiently as possible. In the embodiment in accordance with FIG. 5, the guide structure and the common feed structures 50 are fashioned such that they are open at the top.

Figure 6:
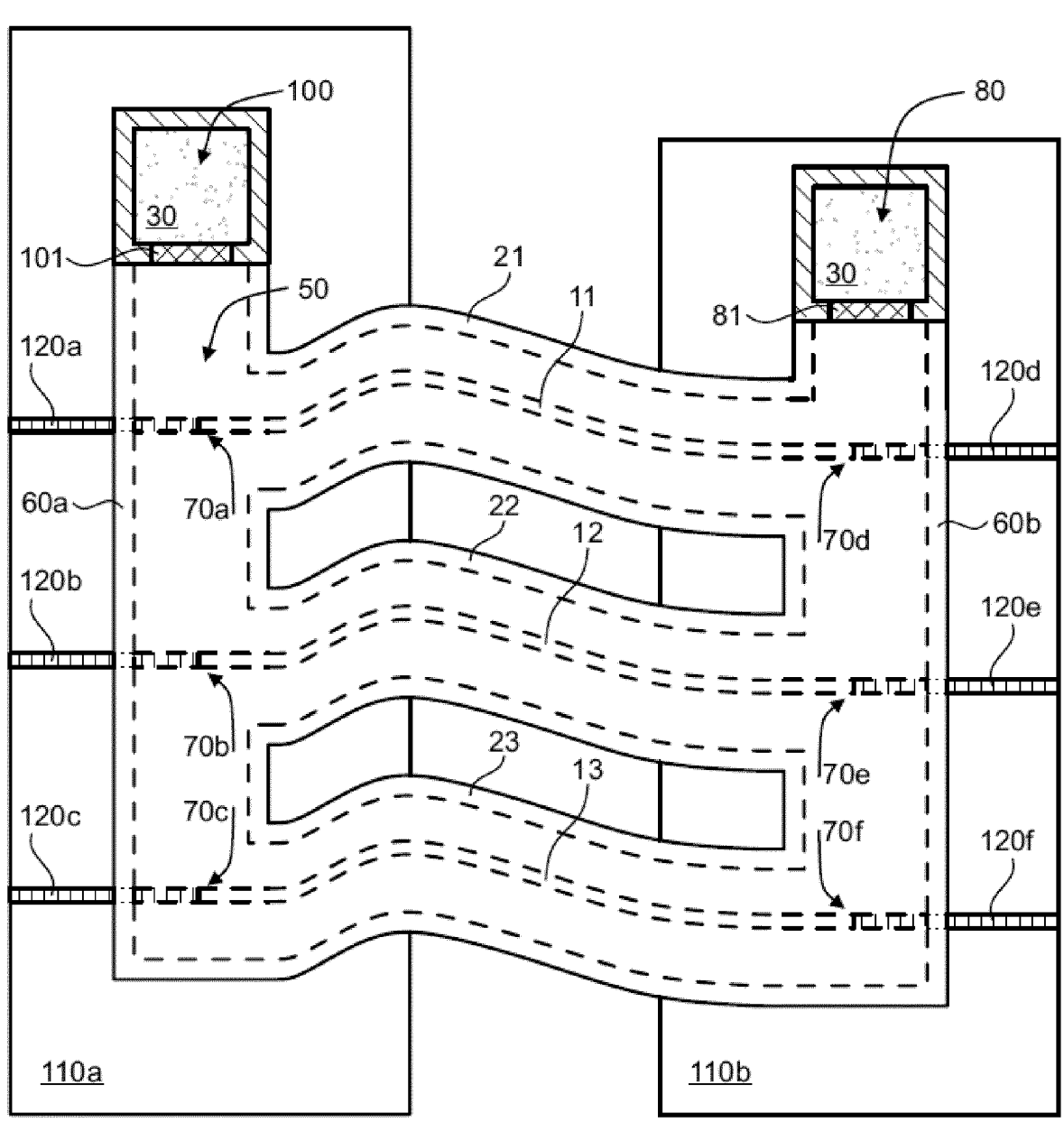
FIG. 6 shows a further preferred exemplary embodiment of the optical waveguide component according to the invention, comprising three optical waveguide structures in a closed embodiment, which is arranged between two optical components and has a common feed point and also an outlet element.

FIG. 6 shows an alternative embodiment, comprising feed structures 50 and a guide structure 20 that is closed off spatially toward the outside. In addition to the common feed point 100, these structures can also have a common outlet element 80, via the opening 81 of which to the outlet element 80 excess cladding material 30 can escape. In particular, in connection with the filling of a closed spatial region, the outlet element 80 can perform the function of a pressure relief valve. In general, the cladding material 30 can be left in the liquid state or can optionally be cured after the filling of the guide structure 20 and the at least one optical waveguide structure 10 embedded in the material can thus be additionally stabilized, for example to withstand external mechanical influences or environmental influences.

Figure 7:
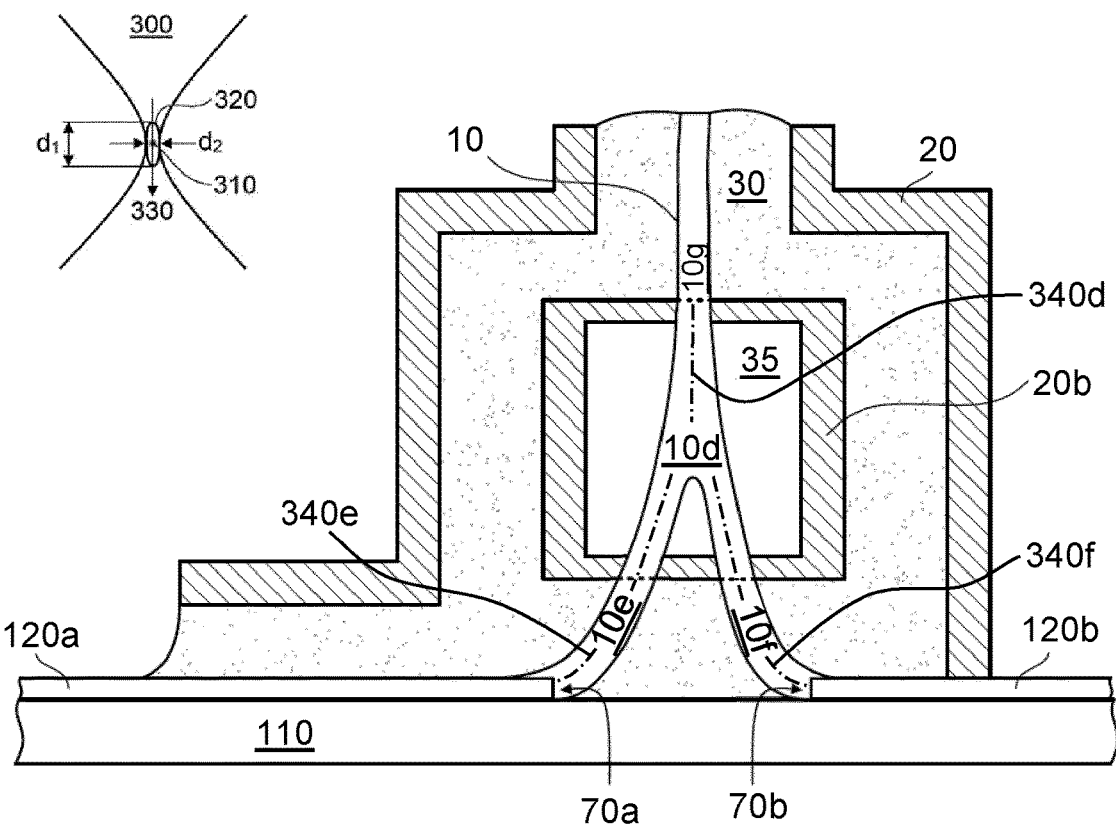
FIG. 7 shows one preferred exemplary embodiment of the optical waveguide component according to the invention, having a protective structure.

FIG. 7 shows by way of example how the optical waveguide structure 10 comprising a plurality of portions 10d, 10e, 10f, 10g can be protected in the portion 10d against an undesired embedding by the cladding material 30. This can be expedient, as illustrated in FIG. 7, e.g. in the case of a waveguide branch junction of a polarization beam splitter, for which in the portion 10d a locally increased refractive index contrast in comparison with the other portions 10e, 10f, 10g is particularly advantageous. For this purpose, here around the portion 10d there is applied a protective structure 20b as part of the guide structure 20, which produces a protected spatial region 35 that is not filled by the cladding material 30. The other parts of the guide structure 20 here still enclose the entire arrangement, in particular also the protective structure 20b, in such a way that in connection with the filling with the cladding material 30, only the portions 10e, 10f, 10g are enclosed.

FIG. 7 furthermore shows the way of example how it is possible to produce a continuously single-mode structure with locally high index contrast between core and cladding even under the restrictions of a direction-dependent resolution of the structuring method. In the case of the lithography method used for production, a polymerization reaction takes place in a spatial region 320 surrounding a focal point 310 of a lithography beam 300, a so-called voxel, which has an ellipsoidal shape extended along a beam axis 330 and dependent on the numerical aperture of the objective lens used in each case. In the case of two-photon lithography with a frequently used lithography wavelength of 780 nm and a numerical aperture (NA) of 1.4, the length $d_1$ of the voxel measured along the beam axis 330 of the lithography beam 300 is typically between 1 μm and 2 μm, while the width $d_2$ measured perpendicularly thereto is typically less than 500 nm. At the same time, in the case of a waveguide core surrounded by air (refractive index 1.0) in the portion 10d of the waveguide structure 10 and having an operating wavelength of 1.5 μm, a refractive index of 1.5 and a round cross-sectional area, the limit with respect to the multimode characteristic is at a radius of approximately 500 nm. The single-mode configuration of the portion 10d of the waveguide structure 10 that is surrounded by air becomes possible by virtue of the fact that the axis 340d of said portion is oriented substantially parallel to the beam axis 330 of the lithography beam 300. The wording "substantially parallel" here relates to cases in which the local direction of the axis 340d of the waveguide structure forms with the beam axis 330 an angle of preferably less than 45°, particularly preferably less than 30°, and very particularly preferably less than 25° or 20°. For the portions 10e, 10f of the waveguide structure 10 whose axes 340e, 340f are oriented locally perpendicularly or at a large angle with respect to the lithography beam, the single-mode characteristic can be achieved only by way of a local embedding into the high refractive index cladding material 30.

Figure 8:
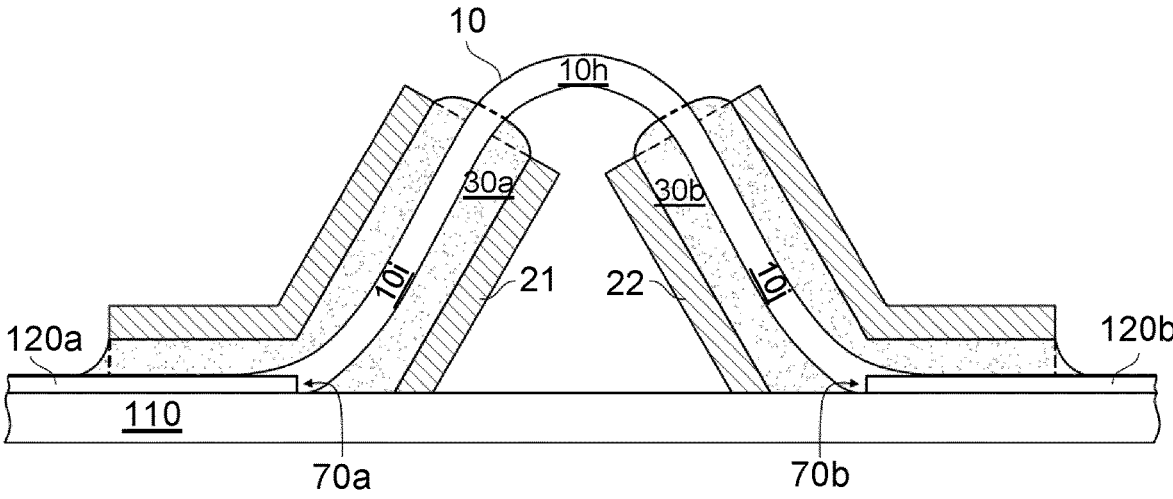
FIG. 8 shows one preferred exemplary embodiment of the optical waveguide component according to the invention, having one optical waveguide structure with differently embodied portions.

FIG. 8 illustrates by way of example how different cladding materials 30a, 30b can be used for the purpose of local coverage for different portions 10i, 10j of the optical waveguide structure 10. The optical waveguide structure 10 produced as a freeform structure becomes detached, proceeding from the optical coupling point 70a at an optical waveguide 120a assigned to the optical substrate 110, in an upward direction and is surrounded by a first substructure 21 of the guide structure 20 in the vicinity of the portion 10i. The optical waveguide structure 10 follows an arbitrary trajectory before it is connected again to an optical waveguide 120b via the further optical coupling point 70b, which is not necessarily situated on the same optical substrate 110. The further portion 10j of the optical waveguide structure 10 is enveloped by a further substructure 22 of the guide structure 20. By introducing two different cladding materials 30a, 30b, it is possible to obtain a different refractive index contrast in the two portions 10i, 10j of the optical waveguide structure 10 within the respective substructures 21, 22 of the guide structure 20. In this exemplary embodiment, a central portion 10h is not covered by the cladding material 30—in the region of the greatly curved waveguide portion 10h a high index contrast can thus be obtained, allowing for example the propagation of light in the form of a so-called "whispering gallery mode".

FIGS. 9 to 15 show three preferred examples that prove the functionality of the present invention.

Figure 9:
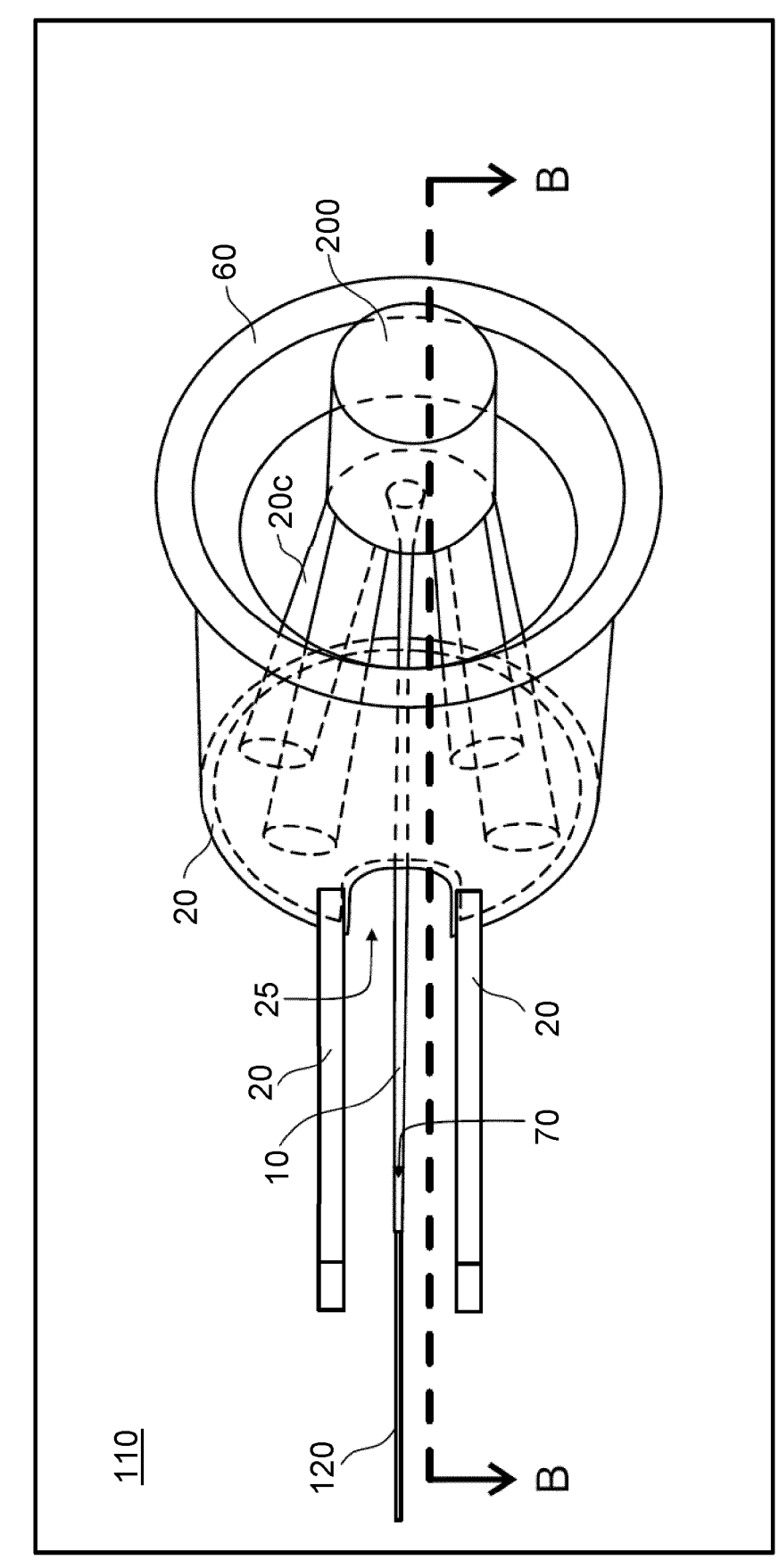
FIGS. 9 and 10 each show one preferred exemplary embodiment of the optical waveguide component in accordance with FIG. 1 before the introduction of the at least one cladding material, in a perspective illustration (FIG. 9) and as a cross section (FIG. 10)
Figure 10:
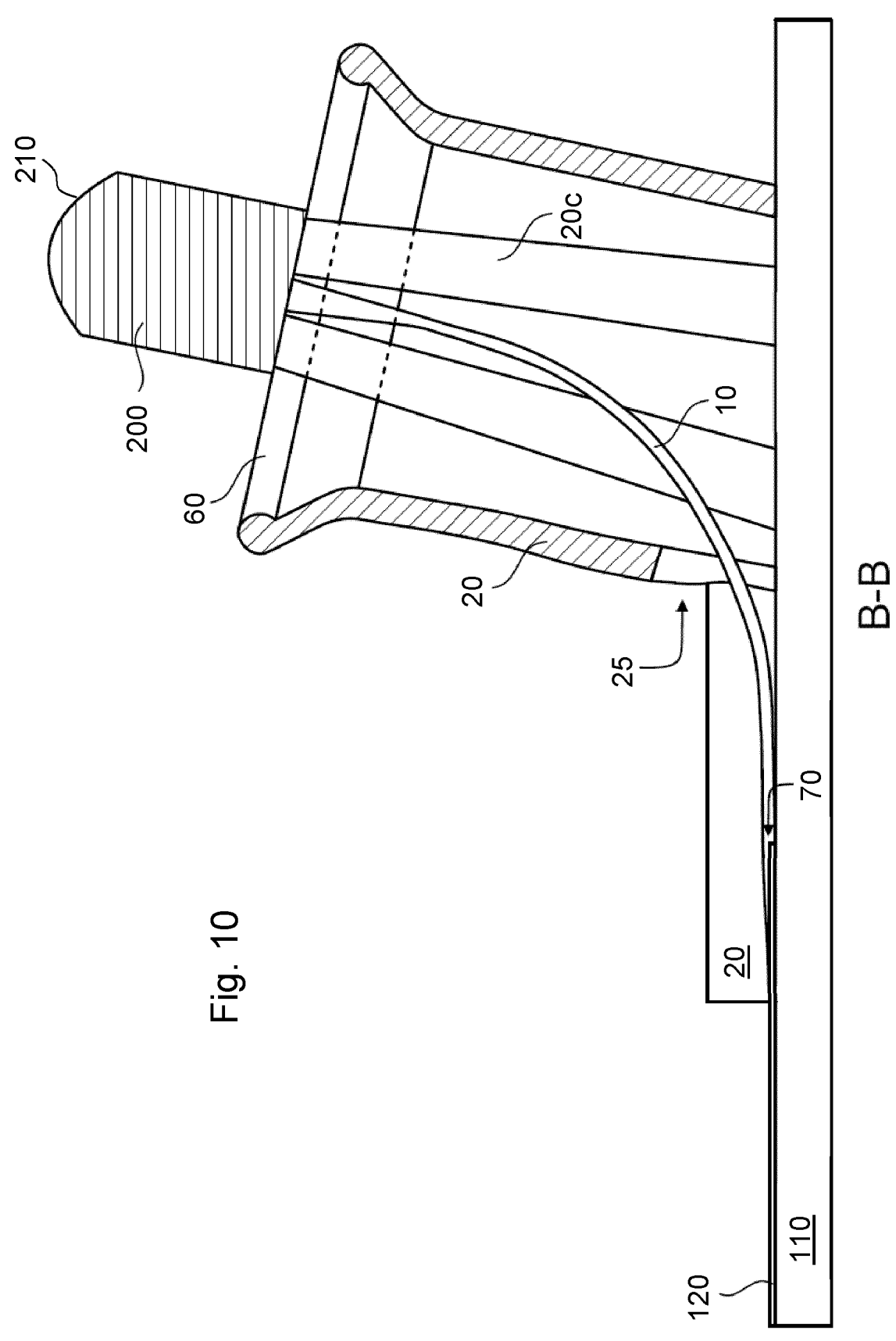
Figures 11, 12:
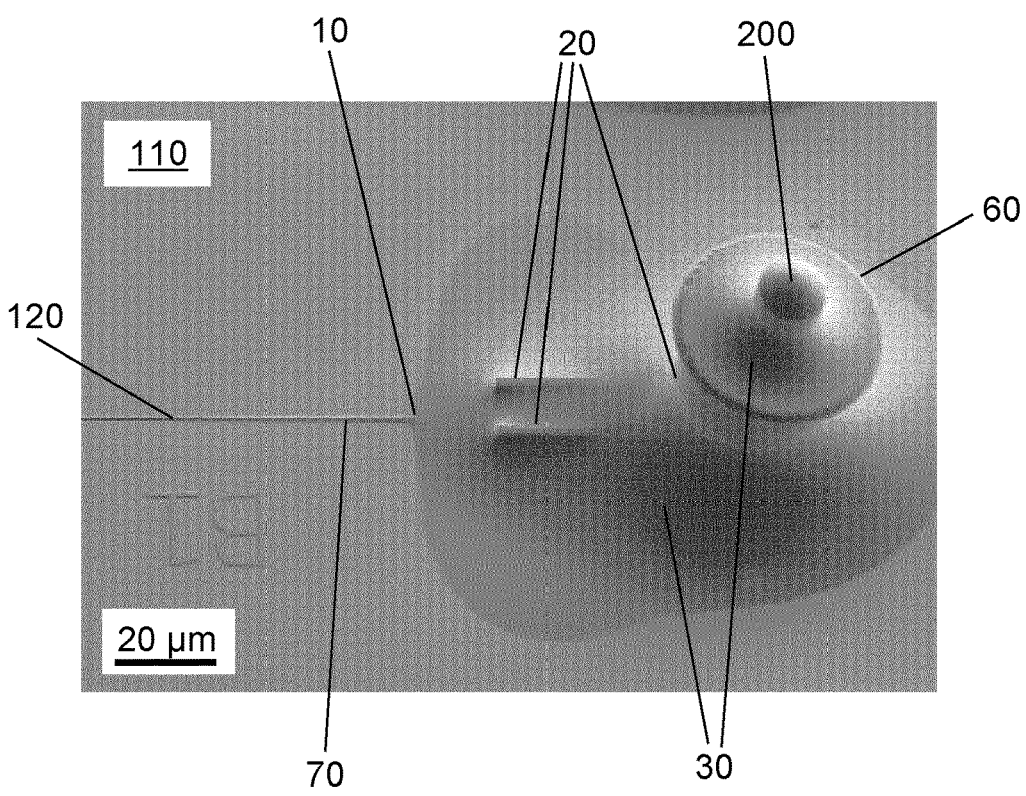
FIG. 11 shows a scanning electron microscope (SEM) micrograph of the optical waveguide component in accordance with FIG. 1 after the introduction of the at least one cladding material, in a perspective view.
FIGS. 12 and 13 each show an SEM micrograph of the optical waveguide component in accordance with FIG. 3 before (FIG. 12) and after (FIG. 13) the introduction of the at least one cladding material, in a plan view.

A first example, relating to the optical waveguide component in accordance with FIG. 1, is illustrated in FIGS. 9 to 11. In this case, FIGS. 9 and 10 each show one preferred example of the optical waveguide component in accordance with FIG. 1 before the introduction of the cladding material 30, in a perspective illustration (FIG. 9) and as a cross section (FIG. 10), while FIG. 11 shows an SEM micrograph after the introduction of the cladding material 30 in a perspective view. The optical waveguide structure 10 produced by multi-photon lithography as a freeform microstructuring method connects the planar integrated optical waveguide 120 on the substrate 110 of an optical component, via the optical coupling point 70, to an optical lens 200 produced by the same freeform microstructuring method, said optical lens being aligned by way of support feet 20c. The optical waveguide component furthermore comprises the guide structure 20, which was likewise produced by the aforementioned freeform microstructuring method. For the purpose of local refractive index matching in the lower region of the optical waveguide structure 10, the cladding material 30 introduced in liquid form by filling is applied, and encloses the waveguide structure 10 without covering the reflective surface 210 of the optical lens 200. In this case, the guide structure 20 serves for feeding the cladding material 30, which can penetrate into the guide structure 20 via an opening 25 therein using the capillary effect and fill it up to a height defined by the fluid stop 60. Consequently, a local coverage of the optical waveguide structure 10 is possible, without enveloping the adjacent optical component, here the adjacent optical lens 200, and thus decreasing the refractive power at the refractive surface 210 of the optical lens 200.

Figure 13:
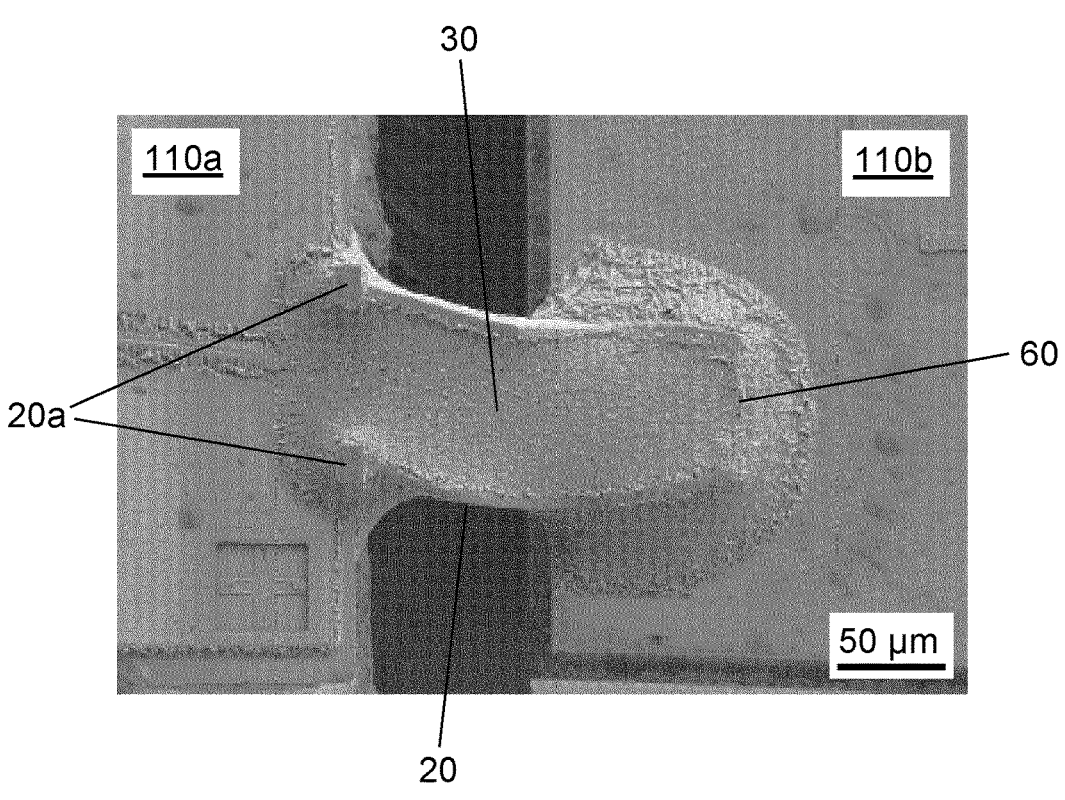

A second example, relating to the optical waveguide component in accordance with FIG. 3, is illustrated in FIGS. 12 and 13. In this case, FIGS. 12 and 13 each show an SEM micrograph of the optical waveguide component in accordance with FIG. 3 before (FIG. 12) and after (FIG. 13) the introduction of the cladding material 30, in a plan view. In this case, the two optical components 110a, 110b are connected to the optical waveguide structure 10 produced by using a freeform microstructuring method, said optical waveguide structure being locally symmetrically surrounded by the cladding material 30. In this case, the shape and trajectory of the optical waveguide structure 10 are adapted as well as possible to the position and orientation of the optical coupling points 70a, 70b of the optical waveguides 120a, 120b situated on the respective optical components 110a, 110b. The three-dimensional geometry of the guide structure 20 is derived from the three-dimensional trajectory of the optical waveguide structure 10 and anchored on one side by support structures 20a on the optical component 110a. With the aid of the guide structure 20, it thus becomes possible to precisely define the shape and extent of the cladding region in a lateral direction and to configure said cladding region in such a way that, apart from unavoidable anchoring points on the optical components 110a, 110b, it has no contact with other elements of the arrangement such as e.g. other optical component parts or mounting plates ("submounts"). This has the consequence of largely minimizing the forces acting on the cladding region from other elements and avoiding a deformation or destruction of the waveguide structure 10 that results from said forces. The cladding material 30 introduced in liquid form by filling can subsequently cure or be cured and encloses the optical waveguide structure 10 virtually symmetrically along the entire trajectory, despite possible gaps present between the optical components 110a, 110b. The printing of both the optical waveguide structure 10 and the guide structure 20 including the support structures 20a and the fluid stop 60 was carried out by using direct writing multi-photon lithography in this example.

Figure 14:
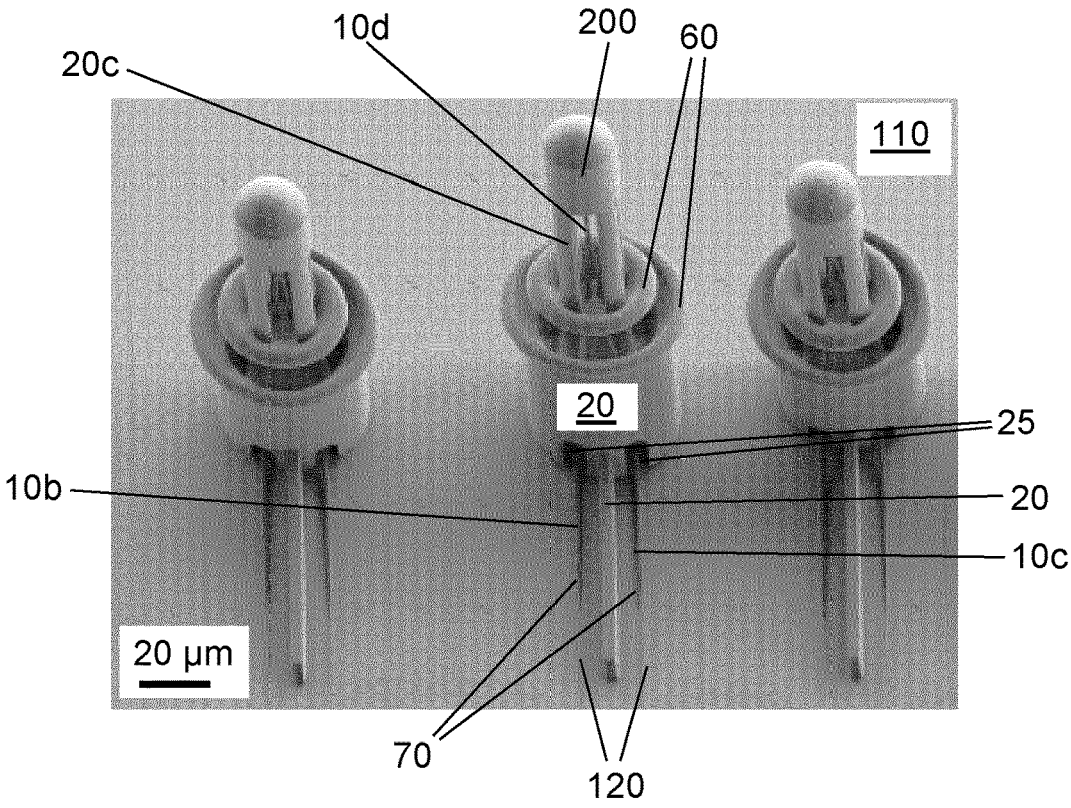
Figure 15:
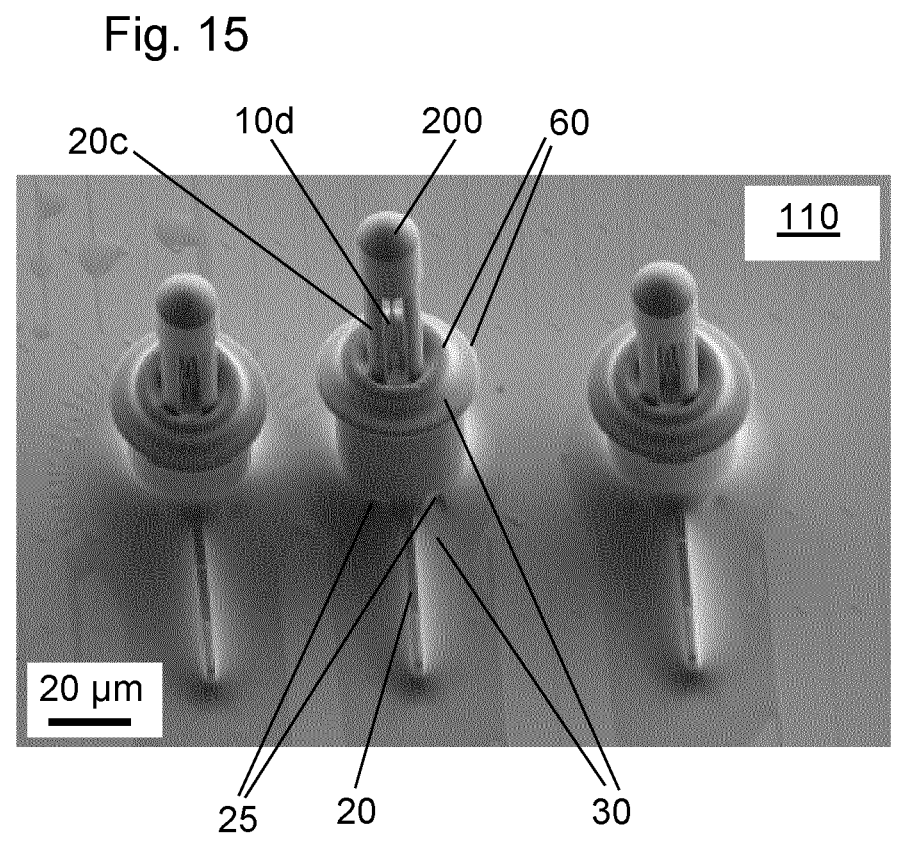

A third example, relating to the optical waveguide component in accordance with FIG. 1 and FIG. 7, respectively, is illustrated in FIGS. 14 and 15. In this case, FIGS. 14 and 15 each show an SEM micrograph of three optical waveguide components in accordance with FIG. 1 before (FIG. 14) and after (FIG. 15) the introduction of the cladding material 30. In this case, each optical waveguide structure 10 comprises the three portions 10b, 10c, 10d, which require a different refractive index contrast between the optical waveguide structure 10 and the respective surroundings for a function that is as optimal as possible. For this purpose, the two feed regions of the optical waveguide structure 10 that are situated in the portions 10b, 10c are surrounded by the cladding material 30, while the polarization beam splitter situated in the portion 10d is intended to have a higher index contrast and is therefore ideally situated in air. The guide structure 20 surrounding the portions 10b, 10c simultaneously serves for feeding the cladding material 30, which can penetrate into the spatial region between the guide structure 20 and the optical waveguide structure 10 via openings 25 in the guide structure 20 and fill the spatial region up to a height defined by the fluid stop 60. Consequently, in each optical waveguide component, a local coverage of the two portions 10b, 10c is possible, while neither the portion 10d of the optical waveguide structure 10 that is designed as a polarization beam splitter nor the optical component that is connected thereto and is present in the form of an optical lens 200 is enveloped by the cladding material 30. The printing of the waveguide structure 10, the guide structure 20 including the fluid stop 60 and also the optical lens 200 including the support feet 20c was carried out by using direct writing multi-photon lithography in this example. In this case, the beam axis 330 of the lithography beam 300 shown in FIG. 7 is oriented perpendicularly to the surface of the optical substrate 110 and thus substantially parallel to the axis of the optical waveguide structure in the portion 10d, with the result that a high-resolution structuring of the waveguide structure in the portion 10d becomes possible despite a voxel lengthened along the beam axis 330 of the lithography beam 300. It thus becomes possible to produce the structure shown in continuously single-mode fashion with locally high index contrast between core and cladding even under the restrictions of a direction-dependent resolution of the structuring method. For reasons of clarity, the reference signs indicated in FIGS. 14 and 15 refer only to the central optical waveguide component illustrated therein, but can analogously be applied to the other two optical waveguide components.

LIST OF REFERENCE SIGNS

| | |
|---|---|
| 10 | Optical waveguide structure |
| 10a-10j | Portion (of an optical waveguide structure) |
| 11, 12, 13 | Further optical waveguide structure |
| 20 | Guide structure |
| 20a | Support structure |
| 20b | Protective structure |
| 20c | Support feet |
| 21, 22, 23 | Substructure (of the guide structure) |
| 25 | Opening (in guide structure) |
| 30, 30a, 30b | Cladding material |
| 35 | Protected spatial region |

-continued

| 50 | Common feed structures |
| 60, 60a, 60b | Fluid stop |
| 70, 70a-70f | Optical coupling point |
| 80 | Outlet element |
| 81 | Opening (to the outlet element) |
| 100 | Feed point |
| 101 | Opening (to the feed point) |
| 110 | Optical substrate |
| 110a, 110b | Optical component |
| 120, 120a-120f | Optical waveguide |
| 200 | Optical lens |
| 210 | Refractive surface |
| 300 | Lithography beam |
| 310 | Focal point |
| 320 | Spatial region (voxel) |
| 330 | Beam axis |
| 340, 340d-340f | Axis of the waveguide structure |

The invention claimed is:

1. An optical waveguide component, comprising
at least one optical waveguide structure configured in form of a first three-dimensional freeform structure and having at least one first portion surrounded by at least one cladding material;
at least one guide structure configured in form of a second three-dimensional freeform structure in a vicinity of the at least one first portion; and
the at least one cladding material, which at least partly fills a spatial region between the at least one first portion and the at least one guide structure, wherein the at least one guide structure defines a region within which the at least one first portion is surrounded by the at least one cladding material, and wherein at least one second portion of the optical waveguide structure or at least one optical component adjacent to the optical waveguide structure is not surrounded by the at least one cladding material, wherein the at least one cladding material has a material absorption of at most 5 dB/mm at an operating wavelength of the waveguide component.

2. The optical waveguide component of claim 1, wherein the at least one guide structure is not directly adjacent to the at least one optical waveguide structure.

3. The optical waveguide component of claim 1, wherein at least one of the guide structure or the cladding material is designed for mechanically stabilizing the at least one optical waveguide structure.

4. The optical waveguide component of claim 1, wherein the at least one cladding material is not structurable with high resolution.

5. The optical waveguide component of claim 1, wherein the at least one optical waveguide structure
has at least two portions surrounded by different cladding materials; or
is surrounded symmetrically by the at least one cladding material.

6. The optical waveguide component of claim 1, furthermore comprising at least one optical substrate, wherein at least one of the optical waveguide structure or the guide structure is applied on the at least one optical substrate.

7. The optical waveguide component of claim 1, wherein the guide structure, apart from the anchoring with the at least one optical substrate, is not adjacent to any other element of the optical waveguide component.

8. The optical waveguide component of claim 1, wherein the at least one optical waveguide structure has at least one distinguished waveguide portion in which the waveguide core is not surrounded by the at least one cladding material, and wherein an axis of the at least one distinguished waveguide portion is arranged substantially perpendicularly to the surface of the optical substrate.

9. The optical waveguide component of claim 1, wherein the optical waveguide component is designed for continuously single-mode light guiding along the at least one optical waveguide structure.

10. The optical waveguide component of claim 1, wherein the at least one guide structure furthermore comprises at least one of
a support structure designed for mechanically fixing the at least one guide structure; or
a fluid stop designed for limiting the at least one cladding material to a subregion of the spatial region between the at least one optical waveguide structure and the at least one guide structure.

11. The optical waveguide component of claim 1, wherein the guide structure has at least two substructures, and wherein a common feed structure is present, which is designed to fill the spatial region between the at least one optical waveguide structure and the at least two substructures by way of a common feed point.

12. The optical waveguide component of claim 1, wherein the optical waveguide component is or comprises at least one of
an optical coupling element, wherein the optical coupling element is designed to transmit light between two optical components or between an optical component and a free space portion; or
a polarization beam splitter.

* * * * *